2,778,775
Patented Jan. 22, 1957

2,778,775

PROCESS FOR PRODUCING ACETONE AND BUTYL ALCOHOL

Firmin Boinot, Grand-Rue, Melle, Deux-Sevres, France, assignor to Les Usines de Melle (Societe Anonyme), Saint-Leger-les Melle, France, a corporation of France No Drawing. Application February 19, 1953,
Serial No. 337,885

2 Claims. (Cl. 195—44)

This invention relates to a fermentation process for producing acetone and butyl alcohol.

Molasses has heretofore been used in aceto-butylic fermentation for the production of acetone and butyl alcohol. Foor this purpose the molasses has been diluted with water to a sugar content of about 6 to 12%. The pH of this solution has been adjusted to about 6 and the solution then sterilized. Nutrient salts such as ammonium sulphate or phosphate, disodium phosphate, superphosphates, etc., have been added and the must so prepared has been sown by means of suitable bacteria. The results obtained by previous processes have varied according to the concentration of the starting must, the kind of molasses (beet molasses, sugar cane molasses, etc.) or the source of same, whether from a sugar factory, distillery or elsewhere.

An object of the present invention is to provide an improved process whereby one or more of the factors involved in fermentation, namely the duration of the fermentation, concentration of the acetone and butyl alcohol produced in the fermented wort and the yield of acetone and alcohol are improved as compared with corresponding factors in the process as previously operated.

The invention accordingly consists of the novel processes and steps of processes, specific embodiments of which are described hereinafter by way of example and in accordance with which I now prefer to practice the invention.

In accordance with my invention I prepare and ferment a mixture of molasses must and sterile milk serum with suitable bacteria to produce acetone and butyl alcohol. The proportion of milk serum employed is about 2–15% by volume of the total volume of serum and molasses. Prior to the addition of the milk serum to the molasses must the serum is sterilized preferably by heating to 120° C. for about 30 minutes. During such heating flocculation of albuminous substances occurs but it is not necessary to remove this flocculate from the serum. Nutrient salts are added to the must but I have found that such addition may be considerably reduced as compared with processes carried out without added milk serum. In accordance with my invention the number and/or amounts of nutrient salts may be reduced, for example the amount of such salts may be lowered to about 20 to 50% of the amount employed when no milk serum is present. For convenience, the products, acetone and butyl alcohol, are hereinafter referred to as "solvents."

The following tabulations show results obtained in carrying out the process of my invention as I now prefer to practice it (Table 2) as compared with prior practice (Table 1). In these tables the charge of molasses is expressed in kilograms of molasses per 100 liters of must.

The time of incubation is the period of time which is comprised between the seeding of the must with aceto-butylic bacteria and the beginning of the fermentation reaction.

The total time of fermentation is the period of time commencing with the seeding of the must with aceto-butylic bacteria through to the end of the fermentation.

Thus, the total time of fermentation includes the time of incubation. All fermentations were carried out between 30 and 36° C.

The yield is expressed in kilograms of solvents per 100 kilograms of sugar contained in the molasses without added serum; and where serum is added it is based on 100 kilograms of combined molasses sugar and serum sugar.

The molasses employed in each of the tables below was beet molasses. The volume of must and kind of molasses were the same in each operation.

*Table 1.—Without addition of milk serum*

The nutrient salts added to the must were as follows: ammonium sulphate, 1.5 grams per liter; disodium phosphate, 0.5 g. per l.

| Vat | Weight Percentage of Molasses per 100 Volumes of Must | Time of Incubation | Total Time of fermentation | Solvents produced (g./l.) | Yield (percent of the sugars) |
|---|---|---|---|---|---|
| | Percent | | | | |
| 1 | 7.5 | 18 hours | 48 hours | 12.4 | 32.5 |
| 2 | 7 | 19 hours | 48 hours | 11.3 | 33.1 |
| 3 | 7.2 | 19 hours | 54 hours | 11.9 | 32.2 |
| 4 | 7.3 | 18 hours | 52 hours | 10.2 | 31.7 |
| Average | 7.2 | 18 hours, 30 min. | 50 hours, 30 min. | 11.4 | 32.3 |

*Table 2.—With added milk serum*

The nutrient salts were as follows: ammonium phosphate, 0.2 g. per l.

The amount of milk serum employed is expressed as a percent of the total volume of molasses must and serum.

| Vat | Weight Percentage of Molasses per 100 Volumes of Must | Milk Serum | Time of Incubation | Total Time of Fermentation | Solvents produced (g./l.) | Yield (Percent of Total Sugars) |
|---|---|---|---|---|---|---|
| | Percent | Percent | | | | |
| 1 | 8.3 | 2 | 10 h | 37 h | 13.3 | 34.5 |
| 2 | 8.1 | 2 | 10 h | 36 h | 12.9 | 33.8 |
| 3 | 8.1 | 2 | 11 h | 35 h | 12.9 | 33.8 |
| 4 | 8 | 2 | 11 h | 39 h | 12.6 | 33.2 |
| Average | 8.1 | 2 | 10 h., 30 m. | 36 h., 40 m. | 12.9 | 33.8 |

Comparison of the tables shows the following advantages of my process. The yield is higher while the previously added nutrient salts are reduced—we introduced only 0.2 g. per liter of ammonium and phosphoric ions instead of 2 g. per liter of ammonium, sodium, phosphoric and sulphuric ions. The time of incubation and total time of fermentation were considerably reduced while the amount of sugar to be fermented was increased. Moreover, as the concentration of sugar is higher, the concentration in the final must of the solvents produced is increased, so that the consumption of heating steam for sterilizing the molasses must before operation and for distilling the products obtained is lowered.

I have found that by operating in accordance with my invention the increase in production of butyl alcohol is generally somewhat higher than the increase in production of acetone.

The proportion of added milk serum may be varied rather widely. However, I have found that too high proportions of milk serum, while increasing the speed of fermentation, cause decrease of yield and diminution of the concentration of solvents, as shown by the following table:

Table 3

| Vat | Weight Percentage of Molasses per 100 Volumes of Must | Milk Serum | Total Time of Fermentation | Solvents produced (g./l.) | Yield (Percent of Total Sugars) |
|---|---|---|---|---|---|
| | Percent | Percent | | | |
| 1 | 10 | 0 | 85 h | 16 | 32 |
| 2 | 10 | 5 | 72 h | 17.65 | 35.2 |
| 3 | 10 | 10 | 65 h | 17.15 | 35 |
| 4 | 10 | 15 | 52 h | 15.97 | 33.2 |
| 5 | 10 | 20 | 52 h | 14.75 | 30.7 |

It may even happen that the time of fermentation, after having reached a minimum, increases again when the proportion of milk serum becomes too high.

This harmful effect is more or less evident according to the kind of molasses in use but generally it is advisable not to employ a proportion of milk serum higher than about 10%.

By the term "milk serum" I mean the liquid remaining after the extraction of fat and casein from milk.

Instead of fresh milk serum I may use milk serum which has been previously concentrated with a view to economically transporting and storing it and to which I add water for restoring its normal concentration before using it. I may also use milk serum, a part of the lactose of which has been previously extracted by crystallization or any other means. Likewise, I may use milk serum which has been previously subjected to partial fermentation by lactic acid producing organisms.

By the expression "milk serum" or "serum" as employed in the appendant claims I intend to cover not only the fresh milk serum but processed serums as set forth in the last preceding paragraph.

What I claim is:

1. A process which comprises fermenting a mixture of molasses must and sterile milk serum with suitable bacteria to produce acetone and butyl alcohol, the proportion of milk serum being about 2 to 15% by volume of the total volume of serum and molasses must.

2. A process in accordance with claim 1 in which the serum before addition to the must is sterilized by heating to 120° C. for about 30 minutes.

References Cited in the file of this patent

UNITED STATES PATENTS

| 2,050,219 | Arzberger | Aug. 4, 1936 |
| 2,089,562 | Legg et al. | Aug. 10, 1937 |

FOREIGN PATENTS

| 23,556 | Great Britain | July 18, 1935 |
| 501,585 | Australia | Feb. 28, 1939 |

OTHER REFERENCES

Heineman: Milk, 1919, W. B. Saunders, Philadelphia, page 71.